United States Patent
Kim

(10) Patent No.: US 11,142,242 B2
(45) Date of Patent: Oct. 12, 2021

(54) APPARATUS AND METHOD FOR CONTROLLING STEER-BY-WIRE SYSTEM TO PREVENT ROTATION OF STEERING WHEEL

(71) Applicant: MANDO CORPORATION, Gyeonggi-do (KR)

(72) Inventor: Seong Joo Kim, Ann Arbor, MI (US)

(73) Assignee: MANDO CORPORATION, Gyeonggi-do (KR)

( * ) Notice: Subject to any disclaimer, the term of this patent is extended or adjusted under 35 U.S.C. 154(b) by 167 days.

(21) Appl. No.: 16/510,667

(22) Filed: Jul. 12, 2019

(65) Prior Publication Data

US 2021/0009197 A1    Jan. 14, 2021

(51) Int. Cl.
| | |
|---|---|
| *B62D 6/00* | (2006.01) |
| *B60R 21/015* | (2006.01) |
| *B60W 10/20* | (2006.01) |
| *B62D 1/16* | (2006.01) |
| *B60N 2/00* | (2006.01) |

(52) U.S. Cl.
CPC ........ *B62D 6/001* (2013.01); *B60R 21/01512* (2014.10); *B60W 10/20* (2013.01); *B62D 1/16* (2013.01); *B60K 2370/143* (2019.05); *B60N 2/002* (2013.01)

(58) Field of Classification Search
CPC .... B62D 6/001; B62D 1/16; B60R 21/01512; B60W 10/20; B60K 2370/143; B60N 2/002

USPC .......................................................... 701/41
See application file for complete search history.

(56) References Cited

U.S. PATENT DOCUMENTS

| | | | | |
|---|---|---|---|---|
| 6,598,695 | B1 | 7/2003 | Menjak et al. | |
| 7,137,347 | B2 * | 11/2006 | Wong | B63H 25/24 114/144 RE |
| 7,174,987 | B2 * | 2/2007 | Husain | B62D 5/003 180/402 |
| 10,654,511 | B1 * | 5/2020 | Cao | B62D 1/181 |
| 2003/0141136 | A1 * | 7/2003 | Menjak | B62D 5/006 180/402 |

\* cited by examiner

*Primary Examiner* — Gertrude Arthur Jeanglaude
(74) *Attorney, Agent, or Firm* — Ladas & Parry, LLP

(57) ABSTRACT

A steer-by-wire system comprises a steering shaft connected to a steering wheel; and a mechanical stop defining end-to-end travel limits of the steering shaft, the end-to-end travel limits comprising a first travel limit end of a first direction and a second travel limit end of a second direction opposite to the first direction. A controller rotates, in response to a signal related to first preset condition(s), the steering shaft toward the first direction until the steering shaft reaches the first travel limit end. And, the controller rotates, in response to a signal related to second preset condition(s), the steering shaft toward the second direction until the steering shaft reaches the second travel limit end. The system can prevent the rotation of the steering wheel using end-to-end travel limits of a mechanical stop of the steering shaft without a locking mechanism when the driver enters or exits the vehicle.

24 Claims, 3 Drawing Sheets

APPARATUS AND METHOD FOR CONTROLLING STEER-BY-WIRE SYSTEM TO PREVENT ROTATION OF STEERING WHEEL

BACKGROUND

Vehicles require a steering system to control the direction of travel. Previously, mechanical steering systems have been used. Mechanical steering systems typically include a mechanical linkage or a mechanical connection between a steering wheel and vehicle's road wheels. Thus, movement of the steering wheel causes a corresponding movement of the road wheels. Movement of such mechanical systems is often power assisted through the use of hydraulic assists or electric motors.

The mechanical steering systems are being replaced or supplemented by electrically driven steering systems, commonly known as "steer-by-wire" systems. Such steer-by-wire systems to varying extents replace, for example, the mechanical linkage between the steering wheel and the vehicle wheels with an electrically assisted actuator. The steer-by-wire system aims to eliminate physical or mechanical connection between a steering wheel and vehicle wheels by using electrically controlled motors change the direction of the vehicle wheels and to provide feedback to a driver.

Because there are virtually no physical connections between the steering wheel and the vehicle wheels, the steer-by-wire systems may require an additional locking mechanism to prevent the steering wheel from turning as an aid when the driver exits or enters the vehicle (thereby providing a grab handle). For example, some steer-by-wire systems may have an Electronic Steering Column Lock (ESCL). When the vehicle is parked and turned off, the ESCL locks the steering wheel by engaging the steering column with the locking mechanism. When a vehicle key is inserted into a key hole, the ESCL releases the locking of the steering when by disengaging the steering column from the locking mechanism.

It is with respect to these and other general considerations that the following embodiments have been described. Also, although relatively specific problems have been discussed, it should be understood that the embodiments should not be limited to solving the specific problems identified in the Background.

SUMMARY

The features and advantages of the present disclosure will be more readily understood and apparent from the following detailed description, which should be read in conjunction with the accompanying drawings, and from the claims which are appended to the end of the detailed description.

According to some embodiments of the present disclosure, a steer-by-wire system may comprise: a steering shaft connected to a steering wheel; a mechanical stop defining end-to-end travel limits of the steering shaft, the end-to-end. travel limits comprising a first travel limit end of a first direction and a second travel limit end of a second direction opposite to the first direction; and a controller configured to, in response to one or more signals related to one or more preset conditions, rotate the steering shaft toward the first direction until the steering shaft reaches the first travel limit end of the mechanical stop.

The signal(s) related to one or more preset conditions may include a command signal for turning off a vehicle. The command signal for turning off the vehicle may be generated when a position of a vehicle key is changed to a lock or off position or when a vehicle power switch is turned off. Further, the signal(s) related to one or more preset conditions may include a signal related to detection of a driver's hand-off of the steering wheel. In addition, the signal(s) related to one or more preset conditions may include a signal indicating a status that a vehicle is in temporary parking. Additionally, the signal(s) related to one or more preset conditions may include a signal related to a mode change between autonomous driving and driver manual driving.

According to certain embodiments of the present disclosure, the steer-by-wire system may further comprise a first sensor configured to sense presence or absence of a driver in the vehicle. The controller may be configured to, in response to the sensed absence of the driver in the vehicle, rotate the steering shaft toward the second direction until the steering shaft reaches the second travel limit end.

The first direction may be set as right and the second direction may be set as left. Alternatively, the first direction may be set as left and the second direction may be set as right.

The controller may be configured to provide a user interface for setting whether the first or second direction is left or right.

According to some embodiments of the present disclosure, the steer-by-wire system further comprise a second sensor configured to sense opening or closing of a driver side door. The controller may be configured to rotate the steering shaft toward the second direction until the steering shaft reaches the second travel limit end when the driver side door is opened and then closed.

The controller may be configured to output warning to the driver when rotating the steering shaft toward the first direction.

According to an embodiment of the present disclosure, the controller may be configured to: store a position of the steering shaft before rotating the steering shaft toward the first direction, and rotate the steering shaft to the stored position of the steering shaft. According to another embodiment of the present disclosure, the controller may be configured to: store a rotating number of the steering shaft toward the first direction, and rotate the steering shaft to a. position corresponding to the stored rotating number of the steering shaft.

According to various embodiments of the present disclosure, a method for controlling a steer-by-wire system which comprises a steering shaft connected to a steering wheel, and a mechanical stop defining end-to-end travel limits of the steering shaft, the end-to-end travel limits comprising a first travel limit end of a first direction and a second travel limit end of a second direction opposite to the first direction, may comprise: receiving one or more signals related to one or more preset conditions; and rotating, in response to the signal(s) related to one or more preset conditions, the steering shaft toward the first direction until the steering shaft reaches the first travel limit end.

The signal(s) related to one or more preset conditions may include a command signal for turning off a vehicle. The command signal for turning off the vehicle may be generated when a position of a vehicle key is changed to a lock or off position or when a vehicle power switch is turned off. Further, the signal(s) related to one or more preset conditions may include a signal related to detection of a driver's hand-off of the steering wheel. In addition, the signal(s) related to one or more preset conditions may include a signal indicating a status that a vehicle is in temporary parking. Additionally, the signal(s) related to one or more preset conditions may include a signal related to a mode change between autonomous driving and driver manual driving.

According to certain embodiments of the present disclosure, the method may further comprise: sensing presence or absence of a driver in the vehicle: and rotating, in response to the sensed absence of the driver in the vehicle, the steering shaft toward the second direction until the steering shaft reaches the second travel limit end.

The method may further comprise providing a user interface for setting whether the first or second direction is left or right.

The first direction may be set as right and the second direction may be set as left. Alternatively, the first direction may be set as left and the second direction may be set as right.

The command signal for turning off the vehicle may be generated when a position of a vehicle key is changed to a lock or off position or when a vehicle power switch is turned off.

According to some embodiments of the present disclosure, the method may further comprise: sensing opening or closing of a driver side door; and rotating the steering shaft toward the second direction until the steering shaft reaches the second travel limit end when the driver door is opened and then closed.

The method may further comprise outputting warning to the driver when rotating the steering shaft toward the first direction.

According to an embodiment of the present disclosure, the method may further comprise: storing a position of the steering shaft before rotating the steering shaft toward the first direction, and rotating the steering shaft to the stored position of the steering shaft. According to another embodiment of the present disclosure, the method may further comprise: storing a rotating number of the steering shaft toward the first direction, and rotating the steering shaft to a position corresponding to the stored rotating number of the steering shaft.

According to various embodiments of the present disclosure, the system and method can prevent the rotation of the steering wheel using end-to-end travel limits of a mechanical stop of the steering shaft without a locking mechanism such as the ESCL when the driver enters or exits the vehicle.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
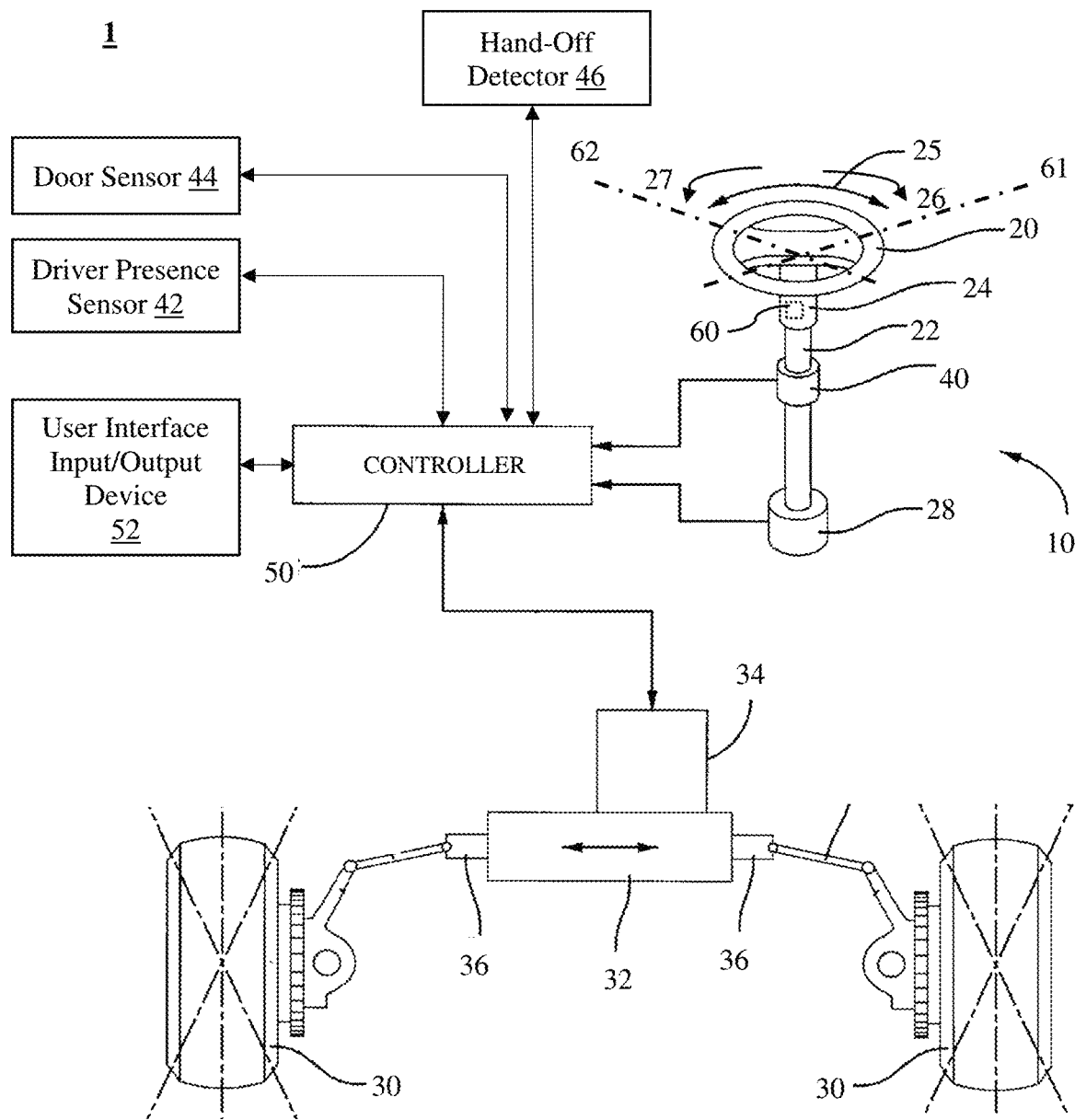
FIG. 1 shows a schematic view of a steer-by-wire system for a vehicle according to an embodiment of the present disclosure.

Referring now to FIG. 1, a steer-by-wire system 10 for use in a vehicle 1 is illustrated. The steering system 10 allows a driver or operator of the vehicle 1 to control the direction of the vehicle or road wheels 30 of the vehicle 1 through the manipulation of a steering wheel 20. The steering wheel 20 is operatively coupled to a steering shaft (or steering column) 22. The steering wheel 20 may be directly or indirectly connected with the steering shaft 22. For example, the steering wheel 20 may be connected to the steering shaft 22 through a gear, a shaft, a belt and/or any connection means. And, a clutch can be installed between the steering wheel 20 and the steering shaft 22 to connect or disconnect between them if desired. The steering shaft 22 may be installed in a housing 24 such that the steering shaft 22 is rotatable within the housing 24.

The vehicle wheels 30 may be connected to knuckles, which are in turn connected to tie rods. The tie rods are connected to a steering assembly 32. The steering assembly 32 may include a steering actuator motor 34 (e.g. an electric motor) and a steering rod 36. The steering rod 36 may be operatively coupled to the steering actuator motor 34 such that the motor 34 is adapted to move the steering rod 36. The movement of the steering rod 36 controls the direction of the road wheels 30 through the knuckles and tie rods.

One or more sensors 40 may configured to detect position, angular displacement or travel 25 of the steering shaft 22 or steering wheel 20, as well as detecting the torque of the angular displacement. The sensors 40 provide electric signals to a controller 50 indicative of the angular displacement 25 and torque. The controller 50 sends and receives signals to/from the electric motor 34 to actuate the electric motor in response to the angular displacement 25 of the steering wheel 20.

A feedback motor 28 (e.g. an electric motor) is connected to the steering shaft 22. For example, a gear or belt assembly may connect an output of the feedback motor 28 to the steering shaft 22. Alternatively, the feedback motor 28 may be directly coupled to the steering shaft 22. The feedback motor 28 is actuatable to provide resistance to rotation of the steering wheel 20. The controller 50 is operatively coupled to the sensors 40 and to the feedback motor 28. The controller 50 receives signals indicative of the applied torque and angular rotation of the steering wheel 20 from the sensors 40. In response to the signals from the sensors 40, the controller 50 generates and transmits a signal corresponding to the sensed torque and angular rotation of the steering wheel 20 sensed by the sensors 40.

In use, the steering wheel 20 is angularly displaced 25 such that the steering shaft 22 can be also angularly displaced. The sensors 40 detect the angular displacement 25 of the steering shaft 22, and the sensors 40 send signals to the controller 50 indicative of the relative amount of angular displacement of the steering shaft 22. The controller 50 sends signals to the steering actuator motor 34 indicative of the relative amount of the angular displacement 30. In response, the steering actuator motor 34 moves the steering rod 36 laterally so that the road wheels 12 are turned. Thus, the controller 50 controls the distance that the steering rod 36 is moved based on the amount of the angular displacement 25 of the steering shaft 22. Movement of the steering rod 36 manipulates the tie rods and knuckles to reposition the road wheels 30 of vehicle 1. Accordingly, when the steering wheel 20 is turned, the road wheels 30 are turned.

In mechanical steering systems, rotation of the steering wheel 20 is limited by the travel of the road wheels 30. The steering wheel 20 in such mechanical systems is usually configured to rotate, for example, but not limited to, about 1.5 times in either direction. However, in the steer-by-wire steering system, the steering wheel 20 may be mechanically isolated from road wheels 30. Thus, the rotation of the steering wheel 20 may not be limited in the steer-by-wire steering system. Accordingly, the steer-by-wire steering system 10 comprises a mechanical stop 60 defining end-to-end travel limits of the steering shaft 22 or steering wheel 20. The mechanical stop 60 is configured to limit rotation of the steering shaft 22 or steering wheel 20 to the certain number of rotations, for example, but not limited to 1.5 rotations (e.g., ±540°). For instance, the mechanical stop 60 is configured to provide the steering shaft 22 with about 1080° of angular displacement 25. The mechanical stop 60 may mechanically prevent over rotation of the steering shaft 22 and steering wheel 20. One of exemplary embodiments of the mechanical stop 60 is disclosed in U.S. Pat. No. 6,598,695, which is hereby incorporated by reference in its entirety. The end-to-end travel limits of the mechanical stop 60 may have a rightmost travel limit end 61 in a right direction 26 and a leftmost travel limit end 62 in a left direction 27. The end-to-end travel limits of the mechanical stop 60 may be fixed or variable. The mechanical stop 60 may be disposed in the housing 24. however, the mechanical stop 60 may be installed at any position Where the mechanical stop 60 can mechanically limit the rotation of the steering shaft 22.

Figure 2:
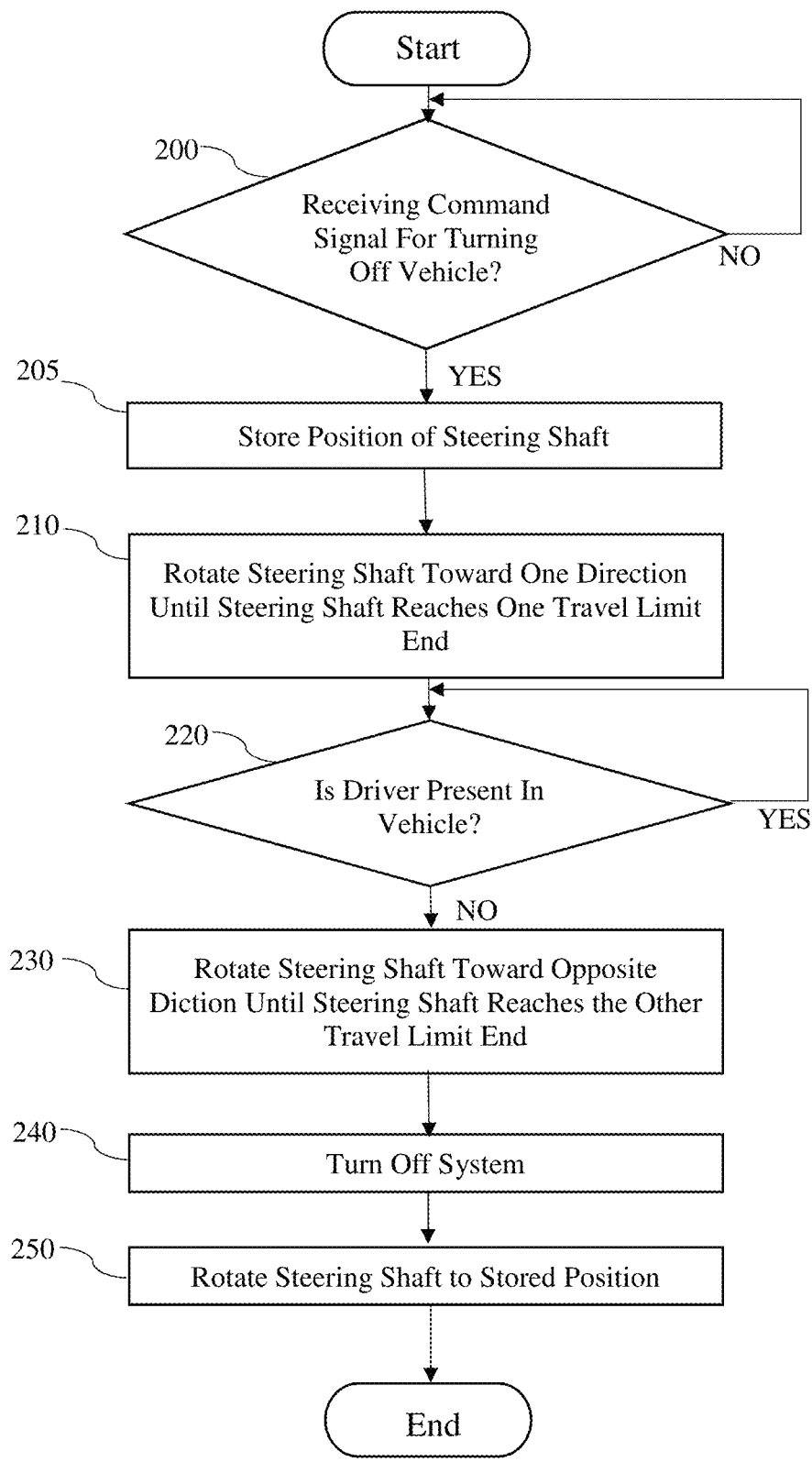
FIG. 2 shows a flow chart of a method for controlling a steer-by-wire system according to an embodiment of the present disclosure.

Referring now to FIG. 2, a method for controlling a steer-by-wire system is illustrated.

At step 200, the controller 50 checks whether the controller 50 receives one or more signals related to one or more preset conditions, such as predefined conditions of a vehicle operator or the vehicle 1.

According to a first embodiment, the signal(s) related to one or more preset conditions may comprise a command signal for turning off the vehicle 1. For example, the command signal for turning off the vehicle is generated when a position of a vehicle key is changed to a lock or off position, when a vehicle power switch is turned off, for example, but not limited to, by the driver's pushing a vehicle power switch, when the removal of a vehicle key from a key hole is sensed, when the opening of the driver-side door is detected, or when any predetermined condition is satisfied. When the controller 50 receives the command signal for turning off the vehicle 1, the controller 50 does not turn off the steer-by-wire system 10. Instead, the controller 50 keep the turning on of all or some parts/elements of the steer-by-wire system 10 for proceeding steps 200 to 230.

According to a second embodiment, the signal(s) related to one or more preset conditions may include a signal related to detection of a driver's hand-off of the steering wheel 20. The driver may hand off the steering wheel 20 to activate various preset functions, for example, but not limited to, activating an autonomous driving mode, changing the current driving mode to another driving mode, initiating automatic parking assist, performing temporary parking, and automatically stopping the vehicle 1 in an emergency situation. The hand-off detector 46 may detect whether the hands of the vehicle operator are positioned on or off the hand or steering wheel 20 of the vehicle 1. The hand-off detector 46 may include one or more sensors placed on or in the steering wheel 20, the housing 24, the steering shaft 22, and/or the feedback motor 28. For instance, the hand-off detector 46 may include a sensing system (or sensor) that measures the capacitance between a conductive layer in the steering wheel (antenna) and the electrical ground in such things as the car body or the seat frame. Further, the hand-off detector 46 may comprise a torque sensor configured to generate a hand wheel torque signal based on a movement of a hand wheel of the vehicle or a pressure sensor configured to detect a pressure on the steering wheel.

According to a third embodiment, the signal(s) related to one or more preset conditions may comprise a signal related to a mode change between autonomous driving and driver manual driving.

According to a fourth embodiment, the signal(s) related to one or more preset conditions may include a signal indicating a status that the vehicle 1 is in temporary parking.

At step 205, when receiving the signal(s) related to one or more preset conditions, the controller 50 stores a position of the steering shaft 22 to memory or a storage device before rotating the steering shaft 22 at step 210. Alternatively, the controller 50 stores a rotating number of the steering shaft 22 toward the first direction after step 210.

At step 210, the controller 50 generates a first control signal for rotating the steering shaft 22 toward a predetermined direction until the steering shaft 22 reaches one of the end-to-end travel limits mechanically defined by the mechanical stop 60. The end-to-end travel limits may comprise a first travel limit end of a first direction and a second travel limit end of a second direction. The second direction may be different from or opposite to the first direction. For example, the first travel limit end may be the leftmost travel limit end 62 and the first direction may be the left direction 27 while the second travel limit end may be the rightmost travel limit end 61 and the second direction may be the right direction 26. Alternatively, the first travel limit end may be the rightmost travel limit end 61 and the first direction may be the right direction 26 while the second travel limit end may be the leftmost travel limit end 62 and the second direction may be the left direction 27.

For instance, in response to the signal(s) related to one or more preset conditions, such as the command signal for turning off the vehicle 1, the controller 50 rotates the steering shaft toward the first direction (e.g. the right direction 26) until the steering shaft 22 reaches the first travel limit end (e.g. the rightmost travel limit end 61) of the end-to-end travel limits of the mechanical stop 60. When the driver exits the vehicle 1, the driver can grab and push the steering wheel 20 toward the first direction (e.g. right). However, the steering wheel 20 is unable to rotate in the first direction and provide support force to the driver toward the first direction because the steering shaft 22 has been rotated to the first travel limit end (e.g. the rightmost travel limit end 61) of the mechanical stop 60 even in the case that the vehicle 1 does not have a mechanism for locking the steering wheel 20 or steering shaft 22 such as the ESCL.

The first direction can be set or changeable by the driver or manufacturer. For example, the manufacturer may preset the first direction to left or right in a manufacturing process. And, the controller 50 may provide a user interface 52 through an input and/or output device, such as a display, a speaker, a microphone, a touch screen, a button, a key pad, and a voice control system, so that the driver can set whether the first direction is left or right.

For instance, the first direction can be set to right. When the controller 50 receives the command signal for turning off the vehicle 1, the controller 50 transmits to the feedback motor 28 a signal for rotating the steering shaft 22 toward the right direction 26 until the steering shaft 22 reaches the rightmost travel limit end 61 mechanically defined by the mechanical stop 60.

In addition, the controller 50 can output, through the output device 52, a warning indicating that the steering wheel 20 will or is rotating before or when the controller 50 rotates the steering shaft 22 to alert the driver or operator of the rotation of the steering wheel 20 for safety purposes.

At step 220, the controller 50 determines whether the driver is out of the vehicle 1. A sensor or multiple sensors can be used to monitor the driver presence in the vehicle 1. For example, a driver presence detector or sensor 42 is configured to sense presence or absence of the driver in the vehicle 1 and send a signal indicative of the sensed presence or absence of the driver, and the controller 50 may determine whether the driver is in or out of the vehicle 1 according to the signal of the driver presence sensor 42. The driver presence sensor 42 may include, for example, but not limited to, a pressure-sensitive sensor, a photoelectric sensor, Known Occupant Classification Sensors, and any other presence detection sensors detecting presence of a person or object. The pressure-sensitive sensor may be embedded in a driver seat to monitor occupancy of the driver seat. The photoelectric sensor may use a beam of light to detect the presence or absence of the driver in the vehicle. Known Occupant Classification Sensors may be used for detecting front seat passengers in passive restraint systems can be used for detecting driver presence in the driver seat. Other presence detection sensors can also be used such as an infrared proximity detector.

Alternatively, the controller 50 can determines whether the driver is out of the vehicle 1 by sensing opening and closing of door of the vehicle 1. For example, a door sensor 44 may detect the opening and closing of door of the vehicle 1. When the door sensor 44 detects the closing of the opened door after the command signal for turning off the vehicle 1, the controller 50 may determine that the driver has gotten out of the vehicle 1.

When the controller 50 determines that the driver has left the vehicle 1 at step 220, the controller 50 generates a second control signal for rotating the steering shaft 22 toward a direction opposite to the direction rotated at step 210 until the steering shaft 22 reaches the other of the end-to-end travel limits mechanically defined by the mechanical stop 60 (step 230).

For instance, when determining that the driver has gotten out of the vehicle 1, the controller 50 rotates the steering shaft toward the second direction (e.g. the left direction 27), Which is opposite to the first direction, until the steering shaft 22 reaches the second travel limit end (e.g. the leftmost travel limit end 62) of the end-to-end travel limits of the mechanical stop 60. This is for preventing the rotation of the steering wheel 20 when the driver is getting in the vehicle 1. When the driver enters into the vehicle 1, the driver can grab and pull the steering wheel 20 toward the second direction (e.g. left). However, the steering wheel 20 will not rotate in the second direction and provide support force to the driver toward the second direction because the steering shaft 22 has been rotated to the second travel limit end (e.g. the leftmost travel limit end 62) of the mechanical stop 60 even in the case that the vehicle 1 does not have a mechanism for locking the steering wheel 20 or steering shaft 22 such as the ESCL.

In an embodiment of the present disclosure, when receiving the command signal for turning off the vehicle 1, the controller 50 generates the first control signal for rotating the steering shaft 22 toward the first direction until the steering shaft 22 reaches the first travel limit end (at step 210), and when determining that the driver exited the vehicle 1, the controller 50 generates the second control signal for rotating the steering shaft 22 toward the second direction opposite to the first direction until the steering shaft 22 reaches the second travel limit end (at step 30). For example, the first travel limit end may be the rightmost travel limit end 61 and the first direction may be the right direction 26 while the second travel limit end may be the leftmost travel limit end 62 and the second direction may be the left direction 27. Alternatively, the first travel limit end may be the leftmost travel limit end 62 and the first direction may be the left direction 27 while the second travel limit end may be the rightmost travel limit end 61 and the second direction may be the right direction 26. As described above, the operator or manufacture can set the first and second directions and the first and second travel limits. Accordingly, the steer-by-wire system according to some embodiments of the present disclosure can prevent the rotation of the steering wheel using end-to-end travel limits of a mechanical stop of the steering shaft without a locking mechanism when the driver enters or exits the vehicle.

At step 240, the controller 50 may turn off the steer-by-wire system 10.

At step 250, the controller 50 may generates a third control signal for rotating the steering shaft 22 to the position stored at step 205 or for rotating the steering shaft 22 to a position corresponding to the rotating number of the steering shaft 22 stored by the controller 50. Alternatively, the controller 50 may generates the third control signal for rotating the steering shaft 22 to a prestored position such as a middle of the angular displacement 25 of the steering shaft 22 or a position set by a manufacturer or a vehicle operator. The controller 50 may perform step 250 after the vehicle is turned on and the driver enters the vehicle.

Figure 3:
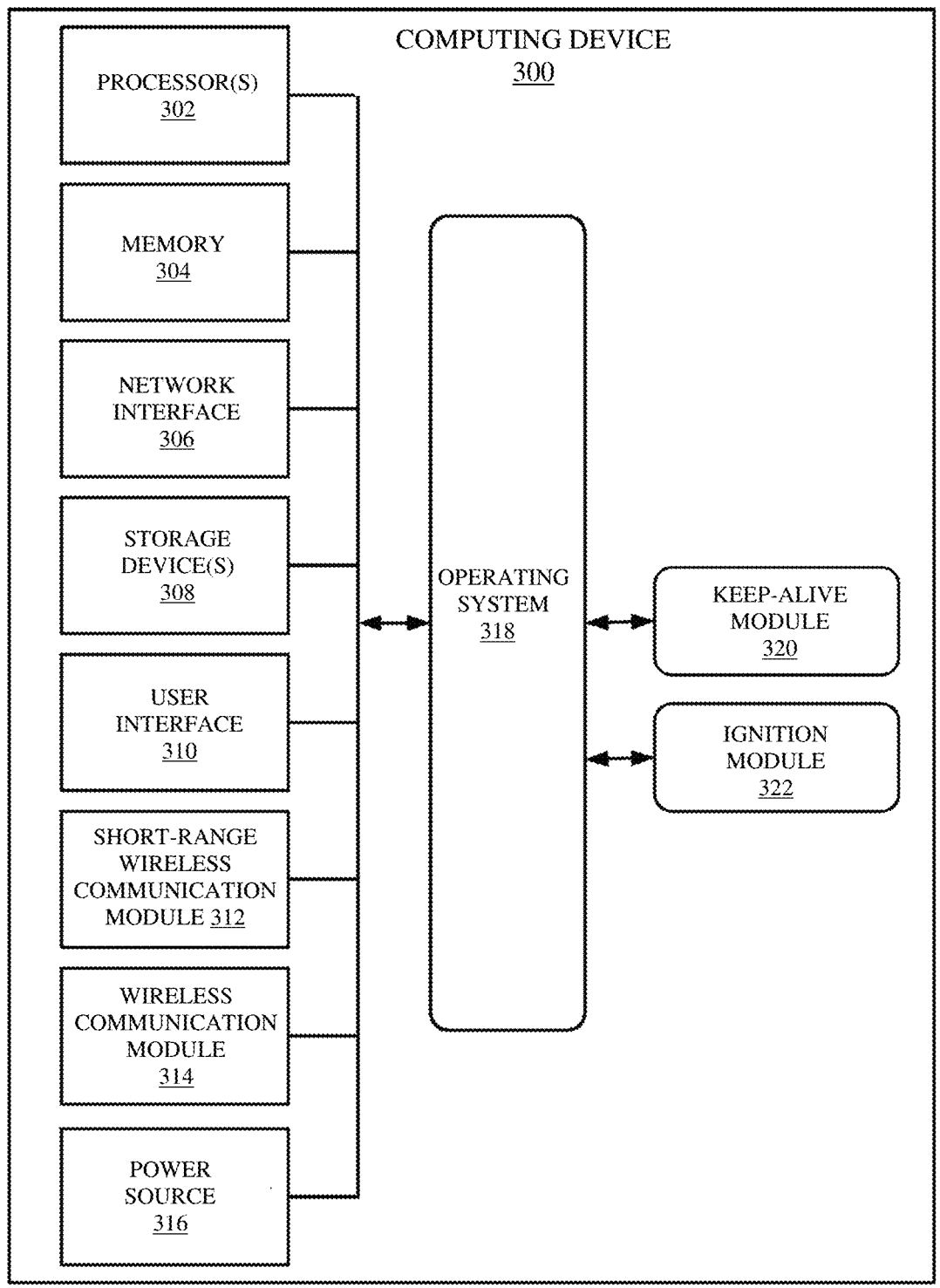
FIG. 3 shows a block diagram of a computing device according to an embodiment of the present disclosure.

FIG. 3 illustrates a block diagram illustrating components of an example computing device 300, such as the controller 50 shown in FIG. 1. FIG. 3 illustrates only one particular example of the controller 50, and many other examples of the controller 50 may be used in other instances.

As shown in the specific example of FIG. 3, the computing device 300 may include one or more processors 302, memory 304, network interface 306, one or more storage devices 308, user interface 310, short-range wireless communication module 312, wireless communication module 314, and power source 316. Computing device 300 may also include operating system 318, which may include modules and/or applications that are executable by one or more processors 302 and computing device 300. Computing device 300, in one example, may also include keep-alive module 320 and ignition module 322, both of which may be executable by one or more processors 302 of computing device 300. Each of the components 302, 304, 306, 308, 310, 312, 314, 316, 318, 320, and 322 may be interconnected (physically, communicatively, and/or operatively) for inter-component communications.

One or more processors 302, in one example, may be configured to implement functionality and/or process instructions for execution within computing device 300. For example, one or more processors 302 may be capable of processing instructions stored in memory 304 or instructions stored on one or more storage devices 308. These instructions may define or otherwise control the operation of operating system 318, keep-alive module 320, and ignition module 322.

Memory 304 may, in one example, be configured to store information within computing device 300 during operation. Memory 304, in some examples, may be described as a computer-readable storage medium. In some examples, memory 304 may be a temporary memory, meaning that a primary purpose of memory 304 is not long-term storage. Memory 304 may, in some examples, be described as a volatile memory, meaning that memory 304 does not maintain stored contents when computing device 300 is turned off. Examples of volatile memories may include random access memories (RAM), dynamic random access memories (DRAM), static random access memories (SRAM), and other forms of volatile memories known in the art. In some examples, memory 304 may be used to store program instructions for execution by one or more processors 302. Memory 304 may, in one example, be used by software or applications running on computing device 300 (e.g., keep-alive module 320 and ignition module 322) to temporarily store information during program execution.

One or more storage devices 308 may, in some examples, also include one or more computer-readable storage media. One or more storage devices 308 may be configured to store larger amounts of information than memory 304. One or more storage devices 308 may further be configured for long-term storage of information. In some examples, one or more storage devices 308 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 300 may, in some examples, also include network interface 306. Computing device 300 may, in one example, use network interface 306 to communicate with external devices via one or more networks. Network interface 306 may be a network interface card, such as an Ethernet card, an optical transceiver, a radio frequency transceiver, or any other type of device that can send and receive information. Other examples of such network interfaces may include Bluetooth, 5G and Wi-Fi radios in mobile computing devices as well as USB. In some examples, computing device 300 may the network interface 306 to wirelessly communicate with an external device such as a server, mobile phone, or other networked computing device.

Computing device 300 may, in one example, also include user interface 310. User interface 310 may be configured to receive input from a user (e.g., tactile, audio, or video feedback). User interface 310 may include a touch-sensitive and/or a presence-sensitive screen or display, mouse, a keyboard, a voice responsive system, or any other type of device for detecting a command from a user. In some examples, user interface 310 may include a touch-sensitive screen, mouse, keyboard, microphone, or camera.

User interface 310 may also include, combined or separate from input devices, output devices. In this manner, user interface 310 may be configured to provide output to a user using tactile, audio, or video stimuli. In one example, user interface 310 may include a touch-sensitive screen or display, sound card, a video graphics adapter card, or any other type of device for converting a signal into an appropriate form understandable to humans or machines. In addition, user interface 310 may include a speaker, a cathode ray tube (CRT) monitor, a liquid crystal display (LCD), or any other type of device that can generate intelligible output to a user.

Computing device 300, in some examples, may include power source 316, which may be a rechargeable battery and may provide power to computing device 300. Power source 316 may, in some examples, be a battery made from nickel-cadmium, lithium-ion, or other suitable material. In other examples, power source 316 may be a power source capable of providing stored power or voltage from another power source.

In addition, computing device 300 may include short-range wireless communication module 312. Short-range wireless communication module 312 may be active hardware that is configured to communicate with other short-range wireless communication modules. Examples of short-range wireless communication module 312 may include an NFC module, an RFID module, and the like. In general, short-range wireless communication module 312 may be configured to communicate wirelessly with other devices in physical proximity to short-range wireless communication module 312 (e.g., less than approximately ten centimeters, or less than approximately four centimeters). In other examples, short-range wireless communication module 312 may be replaced with an alternative short-range communication device configured to communicate with and receive data from other short-range communication devices. These alternative short-range communication devices may operate according to Bluetooth, Ultra-Wideband radio, or other similar protocols. In some examples, short-range wireless communication module 312 may be an external hardware module that is coupled with computing device 300 via a bus (such as via a Universal Serial Bus (USB) port). short-range wireless communication module 312, in some examples, may also include software which may, in some examples, be independent from operating system 318, and which may, in some other examples, be a sub-routine of operating system 318.

The computing device 300, in some examples, may also include wireless communication module 314. Wireless communication module 314 may, in some examples, may be a device operable to exchange data with other wireless communication modules over short distances (e.g., less than or equal to ten meters). Examples of wireless communication module 214 may include a Bluetooth module, a WiFi direct module, and the like.

Computing device 300 may also include operating system 318. Operating system 318 may, in some examples, control the operation of components of computing device 300. For example, operating system 318 may, in one example, facilitate the interaction of keep-alive module 320 and ignition module 322 with one or more processors 302, memory 304, network interface 306, one or more storage devices 308, user interface 310, short-range wireless communication module 312, wireless communication module 314, and power source 316.

Keep-alive module 320 may be an application being executed on one or more processors 302 that may be configured to periodically send a keep-alive message via a secure connection established by wireless communication module 314 to a vehicle as the motor of the vehicle is running. In some examples, keep-alive module 320 may be configured to periodically send the keep-alive message to a vehicle prior to the motor of the vehicle being started.

Ignition module 322 may be an application being executed on one or more processors 302 that may be configured to send via a secure connection established by wireless communication module 214 an ignition signal to a vehicle that activates an ignition system operable to start the motor of the vehicle Any applications (e.g., keep-alive module 320 and ignition module 322) implemented within or executed by computing device 300 may be implemented or contained within, operable by, executed by, and/or be operatively/communicatively coupled to components of computing device 300 (e.g., one or more processors 302, memory 304, network interface 306, one or more storage devices 308, user interface 310, short-range wireless communication module 312, wireless communication module 314, and/or power source 316).

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A steer-by-wire system, comprising:
   a steering shaft connected to a steering wheel;
   a mechanical stop defining end-to-end travel limits of the steering shaft, the end-to-end travel limits comprising a first travel limit end of a first direction and a second travel limit end of a second direction opposite to the first direction; and
   a controller configured to, in response to one or more signals related to one or more preset conditions, rotate the steering shaft toward the first direction until the steering shaft reaches the first travel limit end of the mechanical stop.

2. The steer-by-wire system of claim 1 wherein the one or more signals related to one or more preset conditions include a command signal for turning off a vehicle.

3. The steer-by-wire system of claim 2, wherein the command signal for turning off the vehicle is generated when a position of a vehicle key is changed to a lock or off position or when a vehicle power switch is turned off.

4. The steer-by-wire system of claim 1, wherein the one or more signals related to one or more preset conditions include a signal related to detection of a driver's hand-off of the steering wheel.

5. The steer-by-wire system of claim 1, wherein the one or more signals related to one or more preset conditions include a signal indicating a status that a vehicle is in temporary parking.

6. The steer-by-wire system of claim 1, wherein the one or more signals related to one or more preset conditions include a signal related to a mode change between autonomous driving and driver manual driving.

7. The steer-by-wire system of claim 1, further comprising a first sensor configured to sense presence or absence of a driver in the vehicle,
   wherein the controller is configured to, in response to the sensed absence of the driver in the vehicle, rotate the steering shaft toward the second direction until the steering shaft reaches the second trawl limit end.

8. The steer-by-wire system of claim 1, wherein the controller is configured to provide a user interface for setting whether the first or second direction is left or right.

9. The steer-by-wire system of claim 1, further comprising a second sensor configured to sense opening or closing of a driver side door,
   wherein the controller is configured to rotate the steering shaft toward the second direction until the steering shaft reaches the second travel limit end when the driver side door is opened and then closed.

10. The steer-by-wire system of claim 1, wherein the controller is configured to output warning to the driver when rotating the steering shaft toward the first direction.

11. The steer-by-wire, system of claim 1, wherein the controller is configured to:
    store a position of the steering shaft before rotating the steering shaft toward the first direction, and
    rotate the steering shaft to the stored position of the steering shaft.

12. The steer-by-wire system of claim 1, wherein the controller is configured to:
    store a rotating number of the steering shaft toward the first direction, and
    rotate the steering shaft to a position corresponding to the stored rotating number of the steering shaft.

13. A method for controlling a steer-by-wire system which comprises a steering shaft connected to a steering wheel, and a mechanical stop defining end-to-end travel limits of the steering shaft, the end-to-end travel limits comprising a first travel limit end of a first direction and a second travel limit end of a second direction opposite to the first direction, the method comprising:
    receiving one or more signals related to one or more preset conditions; and
    rotating, in response to the one or more signals related to one or more preset conditions, the steering shaft toward the first direction until the steering shaft reaches the first travel limit end of the mechanical stop.

14. The method of claim 13, wherein the one or more signals related to one or more preset conditions include a command signal for turning off a vehicle.

15. The method of claim 14, wherein the command signal for turning off the vehicle is generated when a position of a vehicle key is changed to a lock or off position or when a vehicle power switch is turned off.

16. The method of claim 13, wherein the one or more signals related to one or more preset conditions include a signal related to detection of a driver's hand-off of the steering wheel.

17. The method of claim 13, wherein the one or more signals related to one or more preset conditions include a signal indicating a status that a vehicle is in temporary parking.

18. The method of claim 13, wherein the one or more signals related to one or more preset conditions include a signal related to a mode change between autonomous driving and driver manual driving.

19. The method of claim 13, further comprising:
sensing presence or absence of a driver in the vehicle; and
rotating, in response to the sensed absence of the driver in the vehicle, the steering shaft toward the second direction until the steering shaft reaches the second travel limit end.

20. The method of claim 13, further comprising providing a user interface for setting whether the first or second direction is left or right.

21. The method of claim 13, further comprising:
sensing opening or closing of a driver side door; and
rotating the steering shaft toward the second direction until the steering shaft reaches the second travel limit end when the driver door is opened and then closed.

22. The method of claim 13, further comprising outputting warning to the driver when rotating the steering shaft toward the first direction.

23. The method of claim 13, wherein the controller is configured to:
store a position of the steering shaft before rotating the steering shaft toward the first direction, and
rotate the steering shaft to the stored position of the steering shaft.

24. The method of claim 13, wherein the controller is configured to:
store a rotating number of the steering shaft toward the first direction, and
rotate the steering shaft to a position corresponding to the stored rotating number of the steering shaft.

* * * * *